United States Patent
Nishizawa et al.

(10) Patent No.: US 6,873,751 B2
(45) Date of Patent: Mar. 29, 2005

(54) OPTICAL WAVEGUIDE DEVICE AND METHOD FOR FABRICATING THE SAME

(75) Inventors: Motoyuki Nishizawa, Kawasaki (JP); Masatoshi Ishii, Kawasaki (JP); Masayuki Kato, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 42 days.

(21) Appl. No.: 10/288,480

(22) Filed: Nov. 6, 2002

(65) Prior Publication Data

US 2003/0108264 A1 Jun. 12, 2003

(30) Foreign Application Priority Data

Dec. 11, 2001 (JP) ........................................ 2001-377133

(51) Int. Cl.⁷ ............................. G02B 6/10; G02F 1/295
(52) U.S. Cl. ............................. 385/8; 385/40; 385/129; 385/131
(58) Field of Search ............................. 385/2, 4, 8, 40, 385/129–131

(56) References Cited

U.S. PATENT DOCUMENTS 6,078,717 A * 6/2000 Nashimoto et al. ......... 385/130

FOREIGN PATENT DOCUMENTS

| JP | Hei 09-005797 A | 1/1997 | |
| --- | --- | --- | --- |
| JP | 2000-047271 A | 2/2000 | |
| JP | 2000047271 A * | 2/2000 | ........... G02F/1/295 |
| JP | 3144270 B2 | 3/2001 | |
| JP | 2003098559 A * | 4/2003 | ........... G02F/1/295 |

OTHER PUBLICATIONS

JP 2000047271 (Nashimoto et al.) Feb. 18, 2000 (machine translation). [online] [retrieved on May 11, 2004]. Retrieved from JPO website.*

Chen et al., "Guided–Wave Electro–Optic Beam Deflector Using Domain Reversal in LiTaO₃", Journal of Lightwave Technology, vol. 12, No. 8, Aug. 1994, pp 1401–1404.

* cited by examiner

*Primary Examiner*—Akm Enayet Ullah
*Assistant Examiner*—Omar Rojas
(74) *Attorney, Agent, or Firm*—Staas & Halsey LLP (57) ABSTRACT

An optical waveguide comprising an MgO substrate 10, and a slab waveguide layer 24 formed on the MgO substrate 10 and including a core layer 18 of a ferroelectric or an antiferroelectric, further comprises a stress alleviating layer 12 which substantially lattice-matches with the MgO substrate and the slab waveguide layer 24 and has an average thermal expansion coefficient in the range of $7.0 \times 10^{-6} - 14.0 \times 10^{-6}/°$ C. at the room temperature to 700° C. Accordingly, the optical waveguide device utilizing the magnesium oxide substrate can be formed without breaking the optical waveguide layer and the magnesium oxide substrate itself.

24 Claims, 5 Drawing Sheets

OPTICAL WAVEGUIDE DEVICE AND METHOD FOR FABRICATING THE SAME

CROSS-REFERENCE TO RELATED APPLICATIONS

This application is based upon and claims priority of Japanese Patent Application No. 2001-377133, filed on Dec. 11, 2001, the contents being incorporated herein by reference.

BACKGROUND OF THE INVENTION

The present invention relates to an optical waveguide device, more specifically to an optical waveguide which can switch paths of optical signals and can deflect light, and a method for fabricating the optical wave guide device.

Optical signals, whose propagation velocity is high, make high-speed data communication possible. This makes the optical communication dominant in long-distant transmission, such as trunk communication systems. Recently, the transmission band of the optical communication has been on increase. Coupled with the development WDM (Wavelength Division Multiplex) mode, the optical communication becomes increasingly speedy and increases capacities.

To build an infrastructure of hardware of optical fiber nets of trunk communication networks, optical deflectors, which switch paths of optical signals, are necessary.

As the optical deflectors, mechanical micromirrors have been so far used. For the purpose of enabling higher integration and realizing high-speed and low-loss optical communication optical deflectors utilizing refractive index changes owing to electrooptic effect of ferroelectrics have been proposed.

As optical deflectors utilizing refractive index changes owing to the electrooptic effect of the ferroelectrics, prism domain inversion optical deflectors and prism electrode optical deflectors, for example, are proposed (Q. Chen et al., J. Lightwave Tech. vol. 12(1994) 1401, Japanese Patent Laid-Open Publication No. Sho 63-47627 (1987), etc.). These optical deflectors are formed of Ti diffused waveguides or proton exchange optical waveguides formed on $LiNbO_3$ monocrystal substrates. In such optical deflectors, the electrodes are formed between the $LiNbO_3$ monocrystal substrates and the optical waveguides, and an inter-electrode spacing is about 0.5 mm which is a thickness of the $LiNbO_3$ monocrystal substrate. Accordingly, light cannot be deflected without applying high drive voltages as high as, e.g., about 600 V. Furthermore, even the application of a high drive voltage of about 600 V provides only a deflection angle of only about 0.5°; no deflection angle necessary for practical uses can be provided.

On the other hand, Japanese Patent Laid-Open Publication No. Hei-5797/1997 discloses an optical deflector using PLZT (($Pb_{1-x}La_x$) ($Zr_yTi_{1-y}$)$O_3$), which is a ferroelectric whose electrooptic factor is high. This optical deflector includes a thin-film waveguide layer of a 600 nm- ($Pb_{0.88}La_{0.12}$) ($Zr_{0.4}Ti_{0.6}$)$O_3$ epitaxially grown on the (100) plane of a conducting monocrystal substrate of Nb-doped STO ($SrTiO_3$) (hereinafter called an STO substrate). This optical deflector can provide a deflection angle of 10.8° at maximum by setting an applied voltage suitably in a range of, e.g., −012 V to +12 V.

Here, in order to fabricate a practical optical crossconnection device including a large-scale optical switch having above 64 channels, it is preferable to form the above 64 optical switches on one and the same substrate. In this case, when a pitch of the channel waveguides for passing optical signals to the optical switch is 0.7 mm, the substrate must have a width of 0.7 mm×64=44.8 mm at minimum. The STO monocrystal substrate, which has good compatibility with PZT ($Pb(Zr_{1-x}Ti_x)O_3$) and PLZT, is suitable for form the optical waveguides. However, The STO monocrystal substrate is very difficult to be available in a large single crystal, and is very expensive. Accordingly, the use of the STO monocrystal substrate has made it impossible to provide inexpensive optical crossconnection device with a large number of channels.

On the other hand, magnesium oxide monocrystal substrate (hereinafter called an MgO substrate) has relatively good lattice matching with PZT and PLZT. Furthermore, 4-inch φ MgO substrates can be mass-produced, and are inexpensive in comparison with the STO substrates. Then, the use of the MgO substrates will provide at low costs optical crossconnection devices, etc. having a large number of channels.

However, the expansion coefficient of MgO is $14.5 \times 10^{-6}/°$ C., which is much larger in comparison with the expansion coefficient $7.5 \times 10^{-6}/°$ C. of PZT, which is a material of the optical waveguide layer. Accordingly, heat processing of a temperature higher than 800 K for crystallizing the PZT film applies a very large stress to the PZT film, and the optical waveguide layer is broken.

SUMMARY OF THE INVENTION

An object of the present invention is to provide an optical waveguide device which permits the optical waveguide layer of a perovskite oxide, such as PLZT, PZT or others, to be formed on an MgO substrate without breaking the optical waveguide layer, and a method for fabricating the optical waveguide device.

According to one aspect of the present invention, there is provided an optical waveguide device comprising a substrate and an optical waveguide layer formed on the substrate the waveguide layer including a core layer of a ferroelectric or an antiferroelectric, the optical waveguide device further comprising a stress alleviating layer which is formed between the substrate and the optical waveguide layer, substantially lattice-matches with the substrate and the optical waveguide layer, and has an average thermal expansion coefficient in the range of $7.0 \times 10^{-6} - 14.0 \times 10^{-6}/°$ C. at the room temperature to 700° C.

According to another aspect of the present invention, there is provided a method for fabricating an optical waveguide device comprising the step of forming an optical waveguide layer including a core layer of a ferroelectric or an antiferroelectric on a magnesium oxide substrate, the method further comprising the step of forming between the magnesium oxide substrate and the optical waveguide layer a stress alleviating layer which substantially lattice-matches with the magnesium oxide substrate and the optical waveguide layer and having an average thermal expansion coefficient in the range of $7.0 \times 10^{-6} - 14.0 \times 10^{-6}/°$ C. at the room temperature to 700° C.

As described above, the optical waveguide device according to the present invention comprises a magnesium oxide substrate, and an optical waveguide layer formed on the magnesium oxide substrate and including a core layer of a ferroelectric or an antiferroelectric, and further comprises a stress alleviating layer which is formed between the magnesium oxide substrate and the optical waveguide layer, substantially lattice-matches with the magnesium oxide substrate and the optical waveguide layer, and has an average thermal expansion coefficient in a prescribed range at the room temperature to 700° C., whereby stresses to be applied to the optical waveguide layer formed of perovskite oxides, such as PLZT, PZT, etc., on the magnesium oxide substrate can be alleviated. Thus, the optical waveguide device can be formed without breaking the optical waveguide layer and the magnesium oxide substrate itself.

DETAILED DESCRIPTION OF THE INVENTION

A First Embodiment

Figure 1A:
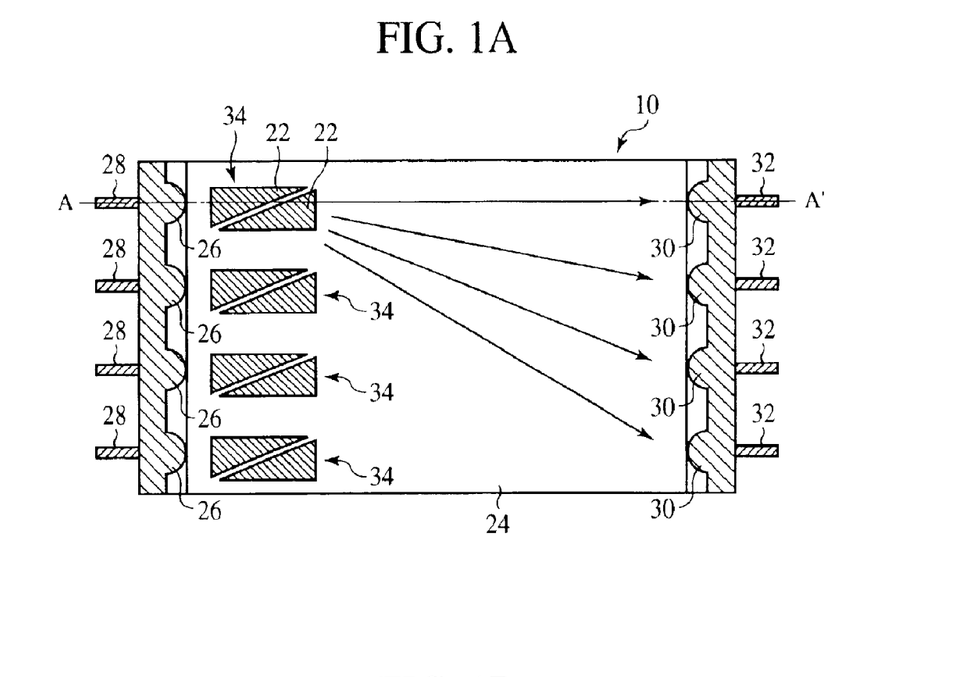
FIGS. 1A and 1B are diagrammatic views of the optical waveguide device according to one embodiment of the present invention, which shows a structure thereof.
Figure 1B:
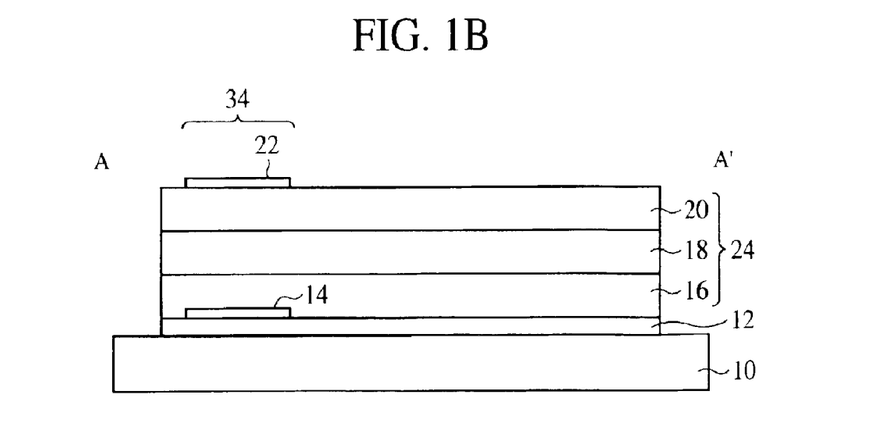

The optical waveguide device according to one embodiment of the present invention and the method for fabricating the optical waveguide device will be explained with reference to FIGS. 1A, 1B, 2, 3, 4A, 4B, 4C, and 4D. FIGS. 1A and 1B are diagrammatic views of the optical waveguide device according to the present embodiment.

(The Optical Waveguide Device)

The optical waveguide device according to the present embodiment will be explained with reference to FIGS. 1A and 1B. FIG. 1A is an upper side view of the optical waveguide device according to the present embodiment, which shows a structure thereof, and FIG. 1B is the sectional view along the line A–A' in FIG. 1A.

As shown in FIG. 1B, a 1000 nm-thickness stress alleviating layer 12 of STO film is formed on an MgO substrate 10. A lattice constant of the stress alleviating layer 12 is 3.91 Å which is approximate to the lattice constant 4.20 Å of the MgO substrate 10. Thus, the stress alleviating layer 12 has good lattice matching with the MgO substrate 10 and is epitaxially grown on the MgO substrate 10. A thermal expansion coefficient of the STO of the stress alleviating layer 12 is $9\times10^{-6}$/° C. at 800 K. This value is between the thermal expansion coefficient $14.5\times10^{-6}$/° C. of MgO and the thermal expansion coefficient $7.5\times10^{-6}$/° C. of PZT of a core layer 18 which will be described later.

Lower electrodes 14 of triangular shape in plane view of a 200 nm-thickness Pt are formed on the stress alleviating layer 12. The lattice constant of the lower electrodes 14 of Pt is 3.92 Å.

A 200 nm-thickness lower clad layer 16 of PLZT is formed on the stress alleviating layer 12 with the lower electrodes 14 formed on. A composition of the PLZT of the lower clad layer 16 is, e.g., $(Pb_{0.91}La_{0.09})(Zr_{0.65}Ti_{0.35})O_3$. The lattice constant of the lower clad layer 16 is 4.08 Å. Thus, the lower clad layer 16 has good lattice matching with the stress alleviating layer 12, and can be epitaxially grown on the stress alleviating layer 12. A refractive index of the lower clad layer 16 is 2.49.

A 2000 nm-thickness core layer 18 of PZT is formed on the lower clad layer 16. A composition of the PZT of the core layer 18 is, e.g., $Pb(Zr_{0.52}Ti_{0.48})O_3$. The lattice constant of the core layer 18 is 4.04 Å. Thus, the core layer 18 has good lattice matching with the lower clad layer 16 and is epitaxially grown on the lower clad layer 16. A refractive index of the core layer 18 is 2.56.

A 2000 nm-thickness upper clad layer 20 of PLZT is formed on the core layer 18. A composition of the PLZT of the upper clad layer 20 is, e.g., $(Pb_{0.91}La_{0.09})(Zr_{0.65}Ti_{0.35})O_3$. The lattice constant of the upper clad layer 20 is 4.08 Å. Thus, the upper clad layer 20 has good lattice matching with the core layer 18 and is epitaxially grown on the core layer 18. A refractive index of the upper clad layer 20 is 2.49.

200 nm-thickness Upper electrodes 22 of Pt which have triangular shape in plane view are formed on the upper clad layer 20. The lattice constant of the upper electrodes 22 is 3.92 Å.

Thus, a slab waveguide layer 24 having the core layer 18 sandwiched by the lower clad layer 16 and the upper clad layer 20 is formed on the MgO substrate 10.

As shown in FIG. 1A, a plurality of lenses are disposed on one end of the MgO substrate 10 with the slab waveguide layer 24 formed on. The respective lenses 26 are connected to channel waveguides 28 into which optical signals are to be inputted.

A plurality of lenses 30 are disposed on the end of the MgO substrate 10 opposed to the end thereof with the lenses 26 disposed on. The respective lenses 30 are connected to channel waveguides 32 to which the optical signals to be outputted.

Prism regions 34 for deflecting optical signals inputted from the channel waveguides 28 are provided in regions near the respective lenses 26 connected to the channel waveguides 28. In the specification of the present application, regions which are sandwiched by the lower electrodes 14 and the upper electrodes 22 to change refractive indexes by application of electric fields are called the prism regions 34.

In the sectional view of FIG. 1B, the lenses 26, 30 and the channel waveguides 28, 32 are omitted.

The optical waveguide device according to the present embodiment is characterized mainly in that the stress alleviating layer 12 of STO is formed between the MgO substrate 10 and the slab waveguide layer 24 of PLZT and PZT.

The thermal expansion coefficient of MgO is $14.5\times10^{-6}$/° C., which is very large in comparison with the thermal expansion coefficient $7.5\times10^{-6}$/° C. of PZT of the optical waveguide. In a case where the PZT film and the PLZT film are formed simply on the MgO substrate, the thermal processing of a high temperature above 800 K for crystallizing the PZT film and the PLZT film applies large stresses to the PZT film and the PLZT film and breaks the films, which sometimes leads to the break of the MgO substrate itself.

In view of this phenomenon, in the present embodiment, the stress alleviating layer 12 for alleviating stresses applied to the slab waveguide layer 24 is formed on the MgO substrate 10. Conditions required of the stress alleviating layer 12 are firstly that the stress alleviating layer 12 has some good lattice matching with magnesium oxide and PZT so that the stress alleviating layer 12 can be epitaxially grown on the MgO substrate 10 and does not hinder the epitaxial growth of the films to be formed thereon, and secondly that a value of the thermal expansion coefficient of a material of the stress alleviating layer 12 is larger than the value of the thermal expansion coefficient of PZT and smaller than the value of the thermal expansion coefficient of magnesium oxide.

The STO of the stress alleviating layer 12 has the lattice constant of 3.9 Å. The thermal expansion coefficient of the STO is $9 \times 10^{-6}/°$ C. at 800 K. The use of STO as a material of the stress alleviating layer 12 enables the epitaxial growth and alleviates stresses to be applied, in the thermal processing, to the slab waveguide layer 24 of PLZT and PZT formed on the MgO substrate 10.

Next, the operation of the optical waveguide device according to the present embodiment will be explained.

Signal light supplied from the ends of the channel waveguides 28 into the slab waveguide layer 24 through the lenses 26 propagate, undergoing total reflections inside the core layer 18.

At this time, when prescribed voltages are applied between the lower electrode 14 and the upper electrode 22 in the prism regions 34, due to the electrooptic effect, the refractive index of the slab waveguide layer 24 for the light is changed in the prism regions 34.

Accordingly, the signal light is deflected corresponding to changes of the refractive index of the prism regions 34 when passing through the prism regions 34. Thus, voltages to be applied between the lower electrode 14 and the upper electrode 22 are suitably controlled to thereby deflect signal light at prescribed deflection angles, and the signal light can be guided to desired channel waveguides 32.

As described above, the optical waveguide device according to the present embodiment can function as an optical crossconnection device, which deflects signal light incident from the respective waveguides 28 by desired deflection angles by suitably changing the refractive index of the prism regions 34 so as to output the signal light to desired channel waveguides 32.

Here, Japanese Patent Laid-Open Publication No. 2000-47271 (2000) discloses an optical waveguide including a core layer of PZT and a clad layer of STO formed on an MgO substrate with a buffer layer of STO formed therebetween.

The optical waveguide device according to the present embodiment is superior, in the following point, to the optical waveguide device including the core layer of PZT and the clad layer of STO formed on an MgO substrate with the buffer layer of STO formed therebetween.

Figure 2:
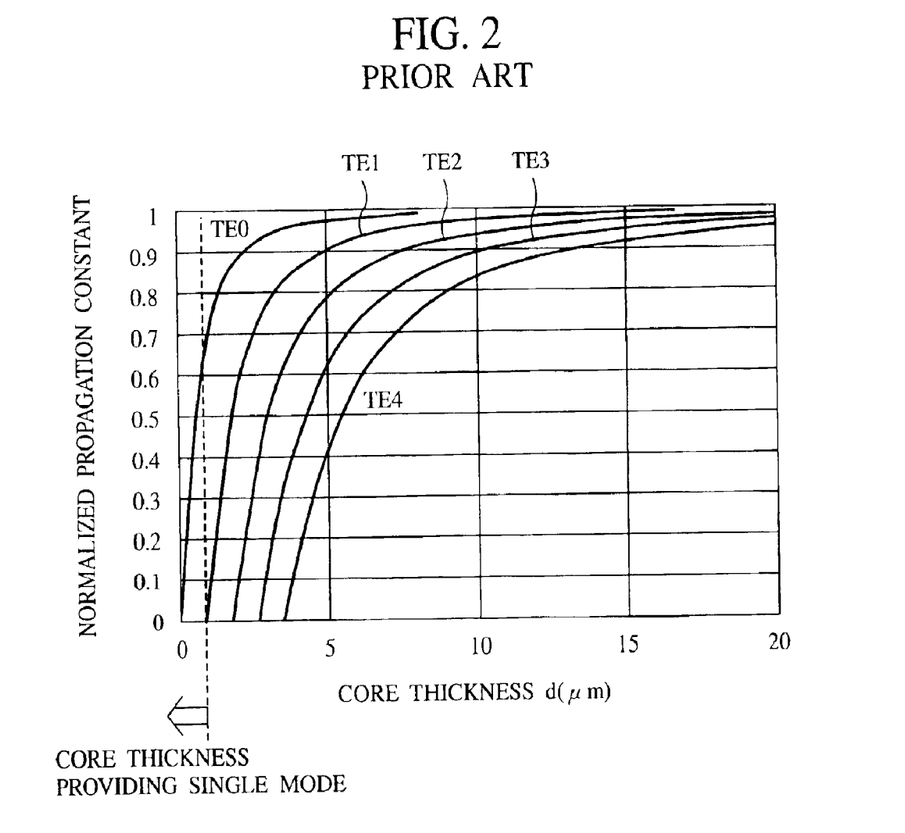
FIG. 2 is a graph of relationships between normalized propagation constants and the thickness of a core layer of the optical waveguide, which includes the core layer of PZT and a clad layer of STO on an MgO substrate with a buffer layer of STO formed therebetween.
Figure 3:
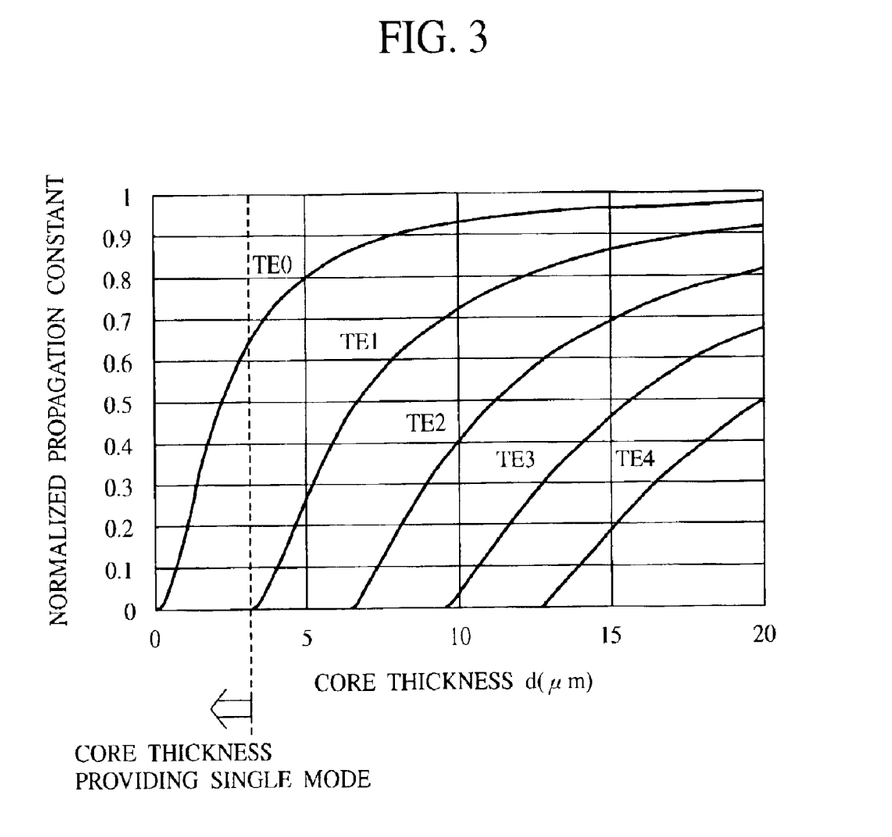
FIG. 3 is a graph of normalized propagation constants and the thickness of the core layer of the optical waveguide according to the embodiment of the present invention.

FIG. 2 is a graph of relationships between the thickness of a core layer and normalized propagation constants in the case that the core layer of PZT and a clad layer of STO are formed on an MgO substrate with a buffer layer of STO formed therebetween. FIG. 3 is a graph of relationships between the thickness of the core layer and normalized propagation constants in the optical waveguide device according to the present embodiment.

In the case that the core layer of PZT and the clad layer of STO are formed on the MgO substrate with the buffer layer of STO formed therebetween, as evident in FIG. 2, a thickness of the core layer for providing a single mode waveguide for the TEO mode alone to propagate through is limited to below about 0.8 $\mu$m. This is a restriction to the designing of the optical waveguide layer.

On the other hand, in the optical waveguide device according to the present embodiment, as evident in FIG. 3, a thickness of the core layer 18 for providing a single mode waveguide for the TEO mode alone to propagate through can be below about 3.2 $\mu$m.

The optical waveguide device according to the present embodiment, which includes the lower clad layer 16 and the stress alleviating layer 12 are formed separate, can provide a single mode waveguide even with the core layer 18 made thick. Thus, the present embodiment can ensure high freedom in designing of the optical waveguide. The core layer 18 can be made thick, which facilitates optical connection between the core layer 18 of the slab waveguide layer 24 and the channel waveguides 28, 32.

As described above, according to the optical waveguide device according to the present embodiment, the stress alleviating layer 12 can alleviate stresses which, when the slab waveguide layer 24 of PLZT and PZT is formed on the MgO substrate 10, are applied to the slab waveguide layer 24 due to the thermal expansion coefficient difference between the material of the MgO substrate 10 and the materials of the slab waveguide layer 24, the stress alleviating layer 12 allowing the MgO substrate 10, which is inexpensive, to be used in the optical waveguide device. Moreover, a thickness of the core layer 18 for providing a single mode waveguide can be large, which makes higher freedom in designing of the optical waveguide layer.

(Method for Fabricating the Optical Waveguide Device)

Then, the method for fabricating the optical waveguide device according to the present embodiment will be explained with reference to FIGS. 4A, 4B, 4C, and 4D. FIGS. 4A, 4B, 4C, and 4D are sectional views of the optical waveguide device according to the present embodiment in the steps of the method for fabricating the same, which show the method. Film forming processes, film forming conditions, film thicknesses, etc. will be described below as an example and are not essential.

Figure 4A:
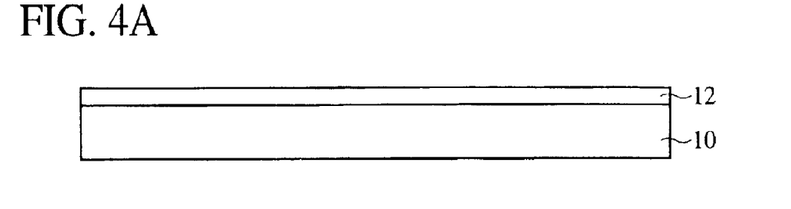
FIGS. 4A, 4B, 4C, and 4D are sectional views of the optical waveguide device according to the embodiment of the present invention in the steps of the method for fabricating the same, which show the method.

First, the stress alleviating layer 12 is formed of a 1000 nm-thickness STO on an MgO substrate 10 by sputtering (FIG. 4A). Conditions for forming the film can be, for example, 600° C. of the substrate temperature, 1.43 W/cm$^2$ of the RF power of the sputtering system, 20 mTorr of the gas pressure and 10% of oxygen partial pressure.

Figure 4B:
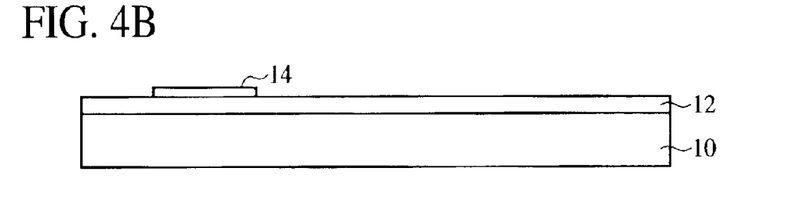

Then, a 200 nm-thickness Pt film is formed on the stress alleviating layer 12 by sputtering. Conditions for forming the film can be, for example, 600° C. of the substrate temperature, 1.6 W/cm$^2$ of the RF output of the sputtering system and 0.1 Pa of Ar gas pressure. Next, the Pt film is patterned in the prescribed triangle. Thus, the lower electrodes 14 of Pt can be formed (FIG. 4B).

Then, a PLZT film is formed by coating pyrolysis method, on the stress alleviating layer 12 with the lower electrodes 14 formed on. To be specific, first the PLZT film is applied by spin coating. Coating conditions can be, for example, 3000 rpm and 30 seconds. Then, the PLZT film is baked at 440° C. and further subjected to thermal processing at 650° C. for 10 minutes to be crystallized. This process is repeated 20 times to form the 2000 nm-thickness lower clad layer 16 of PLZT. A composition of the PLZT is, e.g., $(Pb_{0.91}La_{0.09})(Zr_{0.65}Ti_{0.35})O_3$.

Then, a PZT film is formed on the lower clad layer 16 by coating pyrolysis method. To be specific, the PZT film is applied by spin coating. Coating conditions can be, for example, 3000 rpm and 30 seconds. Then, the PZT film is baked at 440° C. and further subjected to thermal processing at 650° C. for 10 minutes to be crystallized. This process is repeated 20 times to form the 2000 nm-thickness core layer 18 of PZT. A composition of the PZT film is, e.g., $Pb(Zr_{0.52}Ti_{0.48})O_3$.

Then, a PLZT film is formed on the core layer 18 by coating pyrolysis method. To be specific, the PLZT film is applied by spin coating. Coating conditions can be, for example, 3000 rpm and 30 seconds. Then, the PLZT film is baked at 440° C. and further subjected to thermal processing at 650° C. for 10 minutes to be crystallized. This process is repeated 20 times to form the 2000 nm-thickness upper clad layer 20 of PLZT. A composition of the PLZT is, e.g., $(Pb_{0.91}La_{0.09})(Zr_{0.65}Ti_{0.35})O_3$, as is in the case of the lower clad layer 16.

Figure 4C:
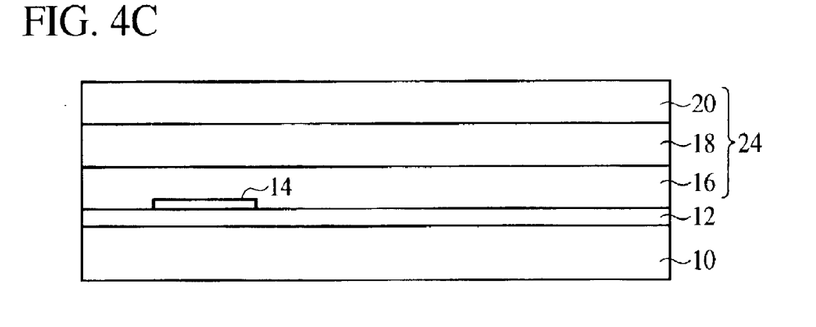

Thus, the slab waveguide layer 24 formed of the lower clad layer 16 of PLZT, the core layer 18 of PZT and the upper clad layer 20 of PLZT is formed (FIG. 4C).

Figure 4D:
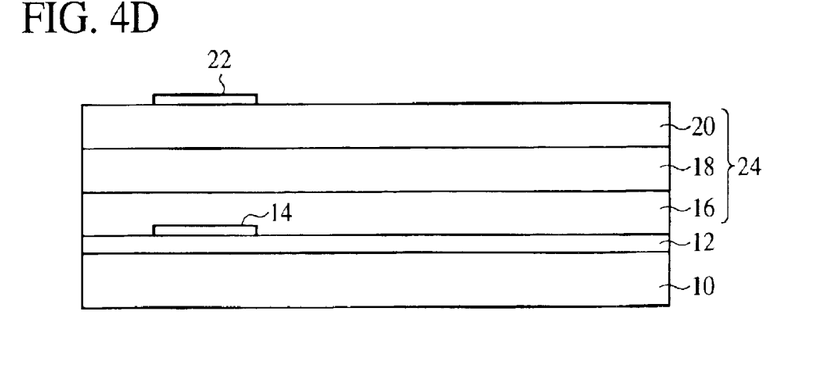

Then, a 200 nm-thickness Pt film is formed on the upper clad layer 20 by sputtering. Conditions for forming the film can be, for example, 450° C. of the substrate temperature, and 0.1 Pa of Ar gas pressure. Then, the Pt film is patterned in the prescribed triangle. Thus, the upper electrodes 22 of Pt are formed (FIG. 4D).

Next, the lenses 26, 30 and the channel waveguides 28, 32 are provided. Thus the optical waveguide device according to the present embodiment is fabricated.

(Evaluation Results)

Evaluation results of the optical waveguide device according to the present embodiment will be explained.

As a control, an optical waveguide device without the stress alleviating layer is fabricated. The optical waveguide device as the control was fabricated under the same conditions as an example, i.e., the optical waveguide device according to the present embodiment, except for not forming the stress alleviating layer. In both the example and the control, the MgO substrates were 20 mm×20 mm×0.3 mm.

The optical waveguide device according to the example and the optical waveguide device without the stress alleviating layer according to the control were evaluated about their states after crystallization annealing at 650° C.

In the optical waveguide device according to the example, no breakage of the slab waveguide layer and the MgO substrate was observed. This shows that the stress alleviating layer alleviates stresses to be applied to the slab waveguide layer.

On the other hand, in the optical waveguide device according to the control, the MgO substrate itself has broken in the crystallization annealing.

The above-described results show that according to the present embodiment, the stress alleviating layer can effectively prevent the breakage of the slab waveguide layer and the MgO substrate itself by the high-temperature thermal processing for crystallizing the slab waveguide layer 24.

Modified Embodiment

Figure 5:
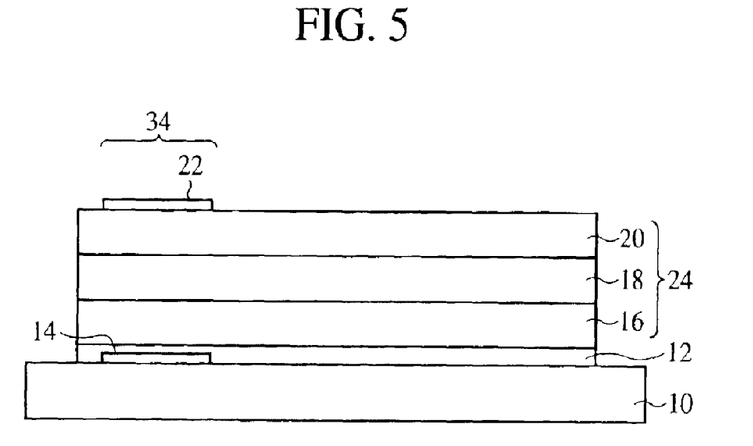
FIG. 5 is a sectional view of one modification of the optical waveguide device according to the embodiment of the present invention.

A modification of the optical waveguide device according to the present embodiment will be explained with reference to FIG. 5. FIG. 5 is a sectional view of the optical waveguide device according to the present modification, which shows a structure thereof.

The optical waveguide device according to the present modification is different from the optical waveguide device shown in FIGS. 1A and 1B in the positions where the lower electrodes 14 are formed. That is, in the optical waveguide shown in FIG. 1, the lower electrodes 14 are formed on the stress alleviating layer 12, but the optical waveguide device according to the present modification is characterized mainly in that the lower electrodes 14 are formed below the stress alleviating layer 12.

As shown in FIG. 5, the lower electrodes 14 of Pt are formed on a MgO substrate 10. The stress alleviating layer 12 of STO is formed on the MgO substrate 10 with the lower electrodes 14 formed on. On the stress alleviating layer 12, a lower clad layer 16 of PLZT, a core layer 18 of PZT and an upper clad layer 20 of PLZT are laid one on the other in the stated sequence. In FIG. 5, structures of the lenses 26, 30 and the channel waveguides 28, 32 are omitted, as is in FIG. 1B.

As described above, the lower electrodes 14 may be formed below the stress alleviating layer 12.

Modifications

The present invention is not limited to the above-described embodiment and can cover other various modifications.

For example, in the above-described embodiment, the optical waveguide device has been explained as an optical crossconnection device, but the optical waveguide device according to the present invention is not limited to the crossconnection device.

In the above-described embodiment, the stress alleviating layer 12 is formed of STO, but the material of the stress alleviating layer 12 is not limited to STO. The material of the stress alleviating layer 12 can be a material having good lattice matching with the MgO substrate 10, the value of an average thermal expansion coefficient which, between the room temperature and 700° C., is larger than the value of an average thermal expansion coefficient of the optical waveguide layer 24 and smaller than the value of an average thermal expansion coefficient of the MgO substrate 10. Specifically, an average thermal expansion coefficient of the stress alleviating layer 12 between the room temperature to 700° C. is preferably $7.0 \times 10^{-6} - 14.0 \times 10^{-6}/°$ C., more preferably $8.0 \times 10^{-6} - 13.0 \times 10^{-6}/°$ C., further more preferably $9.0 \times 10^{-6} - 12.0 \times 10^{-6}/°$ C. To give instances, materials having perovskite crystal structure, such as $(Sr_{1-y},Ba)TiO_3$, $Pb(Zr_{1-x}Ti_x)O_3$, etc., and containing at least any one of Pb, La, Ba, Sr and Ca at A site, and at least any one of Ti, Sn, Zr, Hf at B site can be used as a material of the stress alleviating layer 12.

The stress alleviating layer 12 can have a thickness of at least above 10 nm, preferably 0.03–10 μm, more preferably 0.3–10 μm so as to make the stress alleviating effect sufficient.

In the above-described embodiment, the core layer 18 is formed of PZT. However, the material of the core layer 18 is not limited to PZT and can be formed of any material which is a ferroelectric of a perovskite oxide. For example, ferroelectrics having perovskite structure formed of Pb, Ti and O, ferroelectrics of perovskite crystal structure formed of Pb, Zr, Ti and O, ferroelectrics of perovskite crystal structure formed of Pb, La, Zr, Ti and O or ferroelectrics of perovskite crystal structure formed of Pb, La, Ti and O can be used as a material of the core layer 18.

The material of the core layer 18 can be an antiferroelectric formed of a composite oxide having perovskite crystal structure and containing Pb at A site by above 80% and Sn at B site by above 5% and below 50%. The antiferroelectrics generally means substances whose crystal lattices are divided into two sub-lattices at below Curie points and which have no spontaneous polarization because the respective sub-lattices have polarization magnitudes equal to each other and are oppositely oriented. The core layer 18 is formed of such antiferroelectrics, whereby a voltage is applied, at the room temperature, by the lower electrodes 14 and the upper electrodes 22, whereby the core layer 18 can be phase transited to ferroelectrics. The ferroelectricity of the core layer 18 can be retained even when an applied voltage is returned to null. Accordingly, even when an applied voltage is returned to zero, a spontaneous strain can remain in the core layer 18, whereby a refractive index change can be retained. A technique for retaining a refractive index change by retaining a spontaneous strain in the core layer 18 is disclosed in, e.g., the specification of Japanese Patent Application No. 2001-293761.

In the above-described embodiment, the lower clad layer 16 and the upper clad layer 20 are formed of PLZT. The material of the lower and the upper clad layers 16, 20 are not limited to PLZT.

In the above-described embodiment, the lower electrodes 14 and the upper electrodes 22 are formed of Pt, but the material of the lower and the upper electrodes 14, 22 are not limited to Pt.

In the above-described embodiment, the stress alleviating layer 12 of STO is formed by sputtering, but the process for forming the stress alleviating layer 12 is not limited to sputtering. The stress alleviating layer 12 can be formed by laser abrasion or MOCVD (Metal Organic Chemical Vapor Deposition). Solution processes, such as sol-gel process in which applying and sintering an organic compound, MOD (Metal Organic Decomposition), CSD (Chemical Solution Deposition), etc. can be used.

Similarly, processes for forming the lower clad layer 16 and the upper clad layer 20 formed of PLZT, and the core layer 18 of PZT are not limited to the processes used in the above-described embodiment.

What is claimed is:

1. An optical waveguide device comprising:
   a substrate;
   an optical waveguide layer formed on the substrate, the waveguide layer including a lower clad layer, a core layer of a ferroelectric or an antiferroelectric, formed on the lower clad layer, and an upper clad layer formed on the core layer; and
   a stress alleviating layer which is formed independently of the lower clad layer, the stress alleviating layer being formed between the substrate and the lower clad layer, such that the stress alleviating layer substantially lattice-matches with the substrate and the optical waveguide layer, and has an average thermal expansion coefficient in the range of $7.0 \times 10^{-6}$–$14.0 \times 10^{-6}$/° C. at room temperature to 700° C.

2. An optical waveguide device according to claim 1, wherein
   an average thermal expansion coefficient of the stress alleviating layer at room temperature to 700° C. is in the range of $8.0 \times 10^{-6}$–$13.0 \times 10^{-6}$/° C.

3. An optical waveguide device according to claim 2, wherein
   an average thermal expansion coefficient of the stress alleviating layer at room temperature to 700° C. is in the range of $9.0 \times 10^{-6}$–$12.0 \times 10^{-6}$/° C.

4. An optical waveguide device according to claim 1, wherein
   the substrate is formed of magnesium oxide.

5. An optical waveguide device according to claim 1, further comprising
   a lower electrode formed between the substrate and the optical waveguide layer, and
   a upper electrode formed on the optical waveguide layer, opposed to the lower electrode.

6. An optical waveguide device according to claim 2, further comprising
   a lower electrode formed between the substrate and the optical waveguide layer, and
   a upper electrode formed on the optical waveguide layer, opposed to the lower electrode.

7. An optical waveguide device according to claim 5, wherein
   the lower electrode is formed above or below the stress alleviating layer.

8. An optical waveguide device according to claim 6, wherein
   the lower electrode is formed above or below the stress alleviating layer.

9. An optical waveguide device according to claim 5, wherein
   the lower electrode and/or the upper electrode have triangular shape in plane view, and
   a refractive index of the core layer is changed by applying prescribed voltages to the optical waveguide layer using the lower electrode and the upper electrode.

10. An optical waveguide device according to claim 6, wherein
    the lower electrode and/or the upper electrode have triangular shape in plane view, and
    a refractive index of the core layer is changed by applying prescribed voltages to the optical waveguide layer using the lower electrode and the upper electrode.

11. An optical waveguide device according to claim 1, wherein
    the stress alleviating layer is formed of a material having perovskite crystal structure containing at least any one of Pb, La, Ba, Sr and Ca at A site and any one of Ti, Sn, Zr and Hf at B site.

12. An optical waveguide device according to claim 2, wherein
    the stress alleviating layer is formed of a material having perovskite crystal structure containing at least any one of Pb, La, Ba, Sr and Ca at A site and any one of Ti, Sn, Zr and Hf at B site.

13. An optical waveguide device according to claim 3, wherein
    the stress alleviating layer is formed of a material having perovskite crystal structure containing at least any one of Pb, La, Ba, Sr and Ca at A site and any one of Ti, Sn, Zr and Hf at B site.

14. An optical waveguide device according to claim 11, wherein
    the stress alleviating layer is formed of $SrTiO_3$.

15. An optical waveguide device according to claim 1, wherein
    the core layer is formed of a ferroelectric of perovskite crystal structure of Pb, Ti and O, a ferroelectric of perovskite crystal structure of Pb, Zr, Ti and O, a ferroelectric of perovskite crystal structure of Pb, La, Zr, Ti and O or a ferroelectric of perovskite crystal structure of Pb, La, Ti and O.

16. An optical waveguide device according to claim 1, wherein
    the core layer is formed of an antiferroelectric of perovskite structure in which Pb is present at A site by above 80%, and Sn is present at B site by above 5% to below 50%.

17. An optical waveguide device according to claim 2, wherein the core layer is formed of an antiferroelectric of perovskite structure in which Pb is present at A site by above 80%, and Sn is present at B site by above 5% to below 50%.

18. An optical waveguide device according to claim 3, wherein the core layer is formed of an antiferroelectric of perovskite structure in which Pb is present at A site by above 80%, and Sn is present at B site by above 5% to below 50%.

19. An optical waveguide device according to claim 1, wherein the stress alleviating layer has a thickness of 0.03–10 μm.

20. A method for fabricating an optical waveguide device comprising:

forming an optical waveguide layer on a magnesium oxide substrate, the optical waveguide layer including a lower clad layer, a core layer of a ferroelectric or an antiferroelectric formed on the lower clad layer and an upper clad layer formed on the core layer; and forming between the magnesium oxide substrate and the lower clad layer a stress alleviating layer which substantially lattice-matches with the magnesium oxide substrate and the optical waveguide layer and has an average thermal expansion coefficient in the range of $7.0 \times 10^{-6} – 14.0 \times 10^{-6}/°$ C. at room temperature to 700° C., the stress alleviating layer being formed independently of the lower clad layer.

21. A method for fabricating an optical waveguide device according to claim 20, wherein in the step of forming the stress alleviating layer, the stress alleviating layer having an average thermal expansion coefficient in the range of $8.0 \times 10^{-6} – 13.0 \times 10^{-6}/°$ C. at room temperature to 700° C. is formed.

22. An optical waveguide device according to claim 21, wherein in the step of forming the stress alleviating layer, the stress alleviating layer having an average thermal expansion coefficient in the range of $9.0 \times 10^{-6} – 12.0 \times 10^{-6}/°$ C. at room temperature to 700° C. is formed.

23. A method for fabricating an optical waveguide device according to claim 20, wherein in the step of forming the stress alleviating layer, the stress alleviating layer is formed by sputtering, laser abrasion, metal organic chemical vapor deposition, sol-gel process, metal organic decomposition, or chemical solution deposition.

24. An optical waveguide device comprising:

a substrate;

an optical waveguide structure formed on the substrate, the optical waveguide structure comprising a lower clad layer, a core layer of a ferroelectric or an antiferroelectric formed on the lower clad layer, and an upper clad layer formed on the core layer; and a stress alleviating layer which is formed independently of the lower clad layer and formed between the substrate and the lower clad layer such that the stress alleviating layer substantially lattice-matches with the substrate and the optical waveguide structure, and has an intermediate thermal expansion coefficient, which is between a thermal expansion coefficient of the substrate and a thermal expansion coefficient of the optical waveguide structure.

* * * * *